United States Patent
Jung et al.

(10) Patent No.: US 9,307,396 B2
(45) Date of Patent: Apr. 5, 2016

(54) SYSTEM, METHOD AND MOBILE COMMUNICATION TERMINAL FOR DISPLAYING ADVERTISEMENT UPON ACTIVATION OF MOBILE COMMUNICATION TERMINAL

(75) Inventors: Jae Lark Jung, Goyang-si (KR); Kyoung Duck Bae, Seongdong-gu Seoul (KR)

(73) Assignee: FIRSTFACE CO., LTD., Seoul (KR)

( * ) Notice: Subject to any disclaimer, the term of this patent is extended or adjusted under 35 U.S.C. 154(b) by 0 days.

(21) Appl. No.: 13/590,510

(22) Filed: Aug. 21, 2012

(65) Prior Publication Data

US 2013/0102363 A1    Apr. 25, 2013

(30) Foreign Application Priority Data

Oct. 19, 2011    (KR) .................... 10-2011-0106839

(51) Int. Cl.
| | |
|---|---|
| *H04M 1/00* | (2006.01) |
| *H04B 1/38* | (2015.01) |
| *H04W 8/22* | (2009.01) |
| *H04M 1/725* | (2006.01) |
| *G06F 21/32* | (2013.01) |
| *H04W 12/06* | (2009.01) |
| *H04W 52/02* | (2009.01) |
| *H04W 4/02* | (2009.01) |

(Continued)

(52) U.S. Cl.
CPC ................. *H04W 8/22* (2013.01); *G06F 21/32* (2013.01); *H04M 1/7258* (2013.01); *H04M 1/72519* (2013.01); *H04W 12/06* (2013.01); *H04W 52/027* (2013.01); *H04M 1/67* (2013.01); *H04M 2250/12* (2013.01); *H04M 2250/52* (2013.01); *H04W 4/02* (2013.01); *H04W 4/22* (2013.01)

(58) Field of Classification Search
CPC .......... H04L 67/26; H04L 67/36; H04W 4/06
USPC ........................................ 455/566
See application file for complete search history.

(56) References Cited

U.S. PATENT DOCUMENTS

| | | | |
|---|---|---|---|
| 6,476,797 B1 | 11/2002 | Kurihara et al. | |
| 6,636,732 B1 | 10/2003 | Boling et al. | |
| 7,613,446 B2 | 11/2009 | Engstrom et al. | |

(Continued)

FOREIGN PATENT DOCUMENTS

| | | |
|---|---|---|
| EP | 1990734 A1 | 11/2008 |
| EP | 2076000 | 7/2009 |

(Continued)

OTHER PUBLICATIONS

Think Vantage Fingerprint Software, International Business Machines Corporation, First Edition, Nov. 2005.

(Continued)

*Primary Examiner* — Eugene Yun
(74) *Attorney, Agent, or Firm* — Paratus Law Group, PLLC

(57) ABSTRACT

Provided are a system, method and mobile communication terminal for displaying an advertisement upon activation of the mobile communication terminal. The mobile communication terminal includes a display unit, and an activation button configured to switch an inactive state in which the display unit is off to an active state in which the display unit is on. When the activation button is pressed and thereby the inactive state is switched to the active state, an advertisement is displayed on the display unit.

25 Claims, 3 Drawing Sheets

(51) Int. Cl.
*H04W 4/22* (2009.01)
*H04M 1/67* (2006.01)

(56) References Cited

U.S. PATENT DOCUMENTS

| | | | |
|---|---|---|---|
| 7,623,847 B2 | 11/2009 | Yamashita et al. | |
| 7,668,829 B2 | 2/2010 | Chu et al. | |
| 7,738,916 B2 | 6/2010 | Fukuda | |
| 8,265,607 B2* | 9/2012 | Wormald et al. | 455/414.1 |
| 8,311,514 B2 | 11/2012 | Bandyopadhyay et al. | |
| 8,538,370 B2 | 9/2013 | Ray et al. | |
| 8,660,545 B1* | 2/2014 | Redford et al. | 455/418 |
| 8,782,755 B2 | 7/2014 | Harris et al. | |
| 8,782,775 B2 | 7/2014 | Fadell et al. | |
| 8,811,948 B2 | 8/2014 | Bandyopadhyay et al. | |
| 8,850,365 B2* | 9/2014 | Cumming | 715/864 |
| 9,082,235 B2 | 7/2015 | Lau et al. | |
| 2002/0083329 A1 | 6/2002 | Kiyomoto | |
| 2002/0188855 A1 | 12/2002 | Nakayama et al. | |
| 2003/0018395 A1 | 1/2003 | Crnkovich et al. | |
| 2005/0039135 A1 | 2/2005 | Othmer et al. | |
| 2006/0142071 A1 | 6/2006 | Stephens | |
| 2006/0258289 A1 | 11/2006 | Dua | |
| 2007/0060114 A1 | 3/2007 | Ramer et al. | |
| 2007/0100981 A1 | 5/2007 | Adamczyk et al. | |
| 2007/0136761 A1* | 6/2007 | Basmajian et al. | 725/62 |
| 2007/0249330 A1 | 10/2007 | Cortegiano et al. | |
| 2007/0294725 A1 | 12/2007 | Cohen et al. | |
| 2008/0027813 A1* | 1/2008 | Kogure et al. | 705/14 |
| 2008/0066610 A1 | 3/2008 | Chu et al. | |
| 2008/0070622 A1 | 3/2008 | Lee | |
| 2008/0133336 A1 | 6/2008 | Altman et al. | |
| 2008/0214150 A1 | 9/2008 | Ramer et al. | |
| 2009/0012704 A1 | 1/2009 | Franco et al. | |
| 2009/0017871 A1 | 1/2009 | Brieskorn | |
| 2009/0083850 A1 | 3/2009 | Fadell et al. | |
| 2009/0239591 A1 | 9/2009 | Alameh et al. | |
| 2010/0020020 A1 | 1/2010 | Chen | |
| 2010/0079380 A1 | 4/2010 | Nurmi | |
| 2010/0079508 A1 | 4/2010 | Hodge et al. | |
| 2010/0102939 A1 | 4/2010 | Stewart | |
| 2010/0159898 A1 | 6/2010 | Krzyzanowski et al. | |
| 2010/0304731 A1 | 12/2010 | Bratton et al. | |
| 2010/0312643 A1 | 12/2010 | Gil | |
| 2011/0004678 A1 | 1/2011 | Rothrock | |
| 2011/0069940 A1 | 3/2011 | Shimy et al. | |
| 2011/0080260 A1 | 4/2011 | Wang et al. | |
| 2012/0009896 A1 | 1/2012 | Bandyopadhyay et al. | |
| 2012/0052836 A1 | 3/2012 | Buratti et al. | |
| 2012/0069042 A1 | 3/2012 | Ogita et al. | |
| 2012/0146898 A1 | 6/2012 | Lin | |
| 2012/0302200 A1 | 11/2012 | Esbensen | |
| 2013/0057385 A1 | 3/2013 | Murakami et al. | |
| 2013/0102273 A1 | 4/2013 | Jung et al. | |
| 2013/0102363 A1 | 4/2013 | Jung et al. | |
| 2013/0104187 A1 | 4/2013 | Weidner | |
| 2014/0162598 A1 | 6/2014 | Villa-Real | |
| 2015/0133086 A1 | 5/2015 | Pratt et al. | |

FOREIGN PATENT DOCUMENTS

| | | |
|---|---|---|
| JP | 11-328362 A | 11/1999 |
| JP | 2007-179343 A | 7/2007 |
| KR | 10-1998-0085647 A | 12/1998 |
| KR | 10-2001-0026243 A | 4/2001 |
| KR | 10-2005-007947 A | 8/2005 |
| KR | 10-2006-0033664 | 4/2006 |
| KR | 10-2007-0076317 A | 7/2007 |
| KR | 10-2008-0086757 | 9/2008 |
| KR | 10-2010-0027855 A | 3/2010 |
| KR | 10-2010-0049986 | 5/2010 |
| WO | WO2007033358 A2 | 3/2007 |
| WO | WO2008081420 A2 | 7/2008 |
| WO | WO2010/126504 | 11/2010 |

OTHER PUBLICATIONS

International Search Report for PCT/KR2012/0084170 mailed Mar. 20, 2013, Korean Intellectual Property Office.

European Search Report for EP Application No. 12842666.5 mailed Jul. 21, 2015, European Patent Office.

Daniel, "Concept iPhone 5 with Fingerprint Scanner", http://gadgetsin.com/concept-iphone-5-with-fingerprint-scanner.htm, Aug. 24, 2011.

Alun Taylor, "Acer Tempo M900, Acer's last and best Windows Smartphone?", http://www.theregister.co.uk/2009/07/15/review_phone_acer_tempo_m900/, Jul. 15, 2009.

Apple Inc., "iPhone User Guide (For iOS 4.2 and 4.3 Software)", chapter 1, Mar. 9, 2011,.

* cited by examiner

SYSTEM, METHOD AND MOBILE COMMUNICATION TERMINAL FOR DISPLAYING ADVERTISEMENT UPON ACTIVATION OF MOBILE COMMUNICATION TERMINAL

CROSS-REFERENCE TO RELATED APPLICATION

This application claims the benefit under 35 U.S.C. §119 (a) of Korean Patent Application No. 10-2011-0106839, filed on Oct. 19, 2011, the disclosure of which is incorporated by reference in its entirety for all purposes.

BACKGROUND

1. Field

The following description relates to a system, method and mobile communication terminal for displaying an advertisement upon activation of the mobile communication terminal, and more particularly, to a system, method and mobile communication terminal for displaying an advertisement on a display unit as the mobile communication terminal is switched from an inactive state to an active state.

2. Description of the Related Art

A variety of terminals having several functions as well as a communication function, for example, a smart phone, a cellular phone, a personal digital assistant (PDA) and a web pad, are becoming widespread these days. These terminals do not only enable implementation of an environment that is the same as or similar to a desktop computer but also include a telephone function, and thus are rapidly becoming universal.

In general, these terminals have a button for switching from an inactive state in which a display is off to an active state in which the display is on. Many users tend to consciously or unconsciously press the activation button several times. When the activation button is pressed, a common terminal generally shows very simple information, such as the current time, on a background image set by a user. Thus, when the user presses the activation button of the terminal, he/she obtains no other information and takes no interest, and the terminal is switched back to the inactive state.

SUMMARY

The present invention is directed to adding an advertisement display function to an activation button of a terminal and thereby creating advertising revenue from advertisement display on the terminal and obtaining efficient advertisement effects when the activation button is habitually pressed by a user.

According to an aspect of the present invention, there is provided a mobile communication terminal, including: a display unit; and an activation button configured to switch an inactive state in which the display unit is off to an active state in which the display unit is on. Here, when the activation button is pressed and thereby the inactive state is switched to the active state, an advertisement is displayed on the display unit.

According to another aspect of the present invention, there is provided a system for displaying an advertisement upon activation of a mobile communication terminal, including: an activation sensor configured to receive a sensing signal indicating a switch from an inactive state in which a display unit is off to an active state in which the display unit is on from the mobile communication terminal including the display unit; and an advertisement provider configured to display the advertisement on the display unit of the mobile communication terminal in response to the reception of the sensing signal.

According to still another aspect of the present invention, there is provided a method of displaying an advertisement upon activation of a mobile communication terminal, including: sensing that an activation button for switching an inactive state in which a display unit of the mobile communication terminal is off to an active state in which the display unit is on is pressed; and when it is sensed that the activation button is pressed in the inactive state, displaying the advertisement on the display unit.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

Elements, features, and structures are denoted by the same reference numerals throughout the drawings and the detailed description, and the size and proportions of some elements may be exaggerated in the drawings for clarity and convenience.

DETAILED DESCRIPTION

Figure 1:
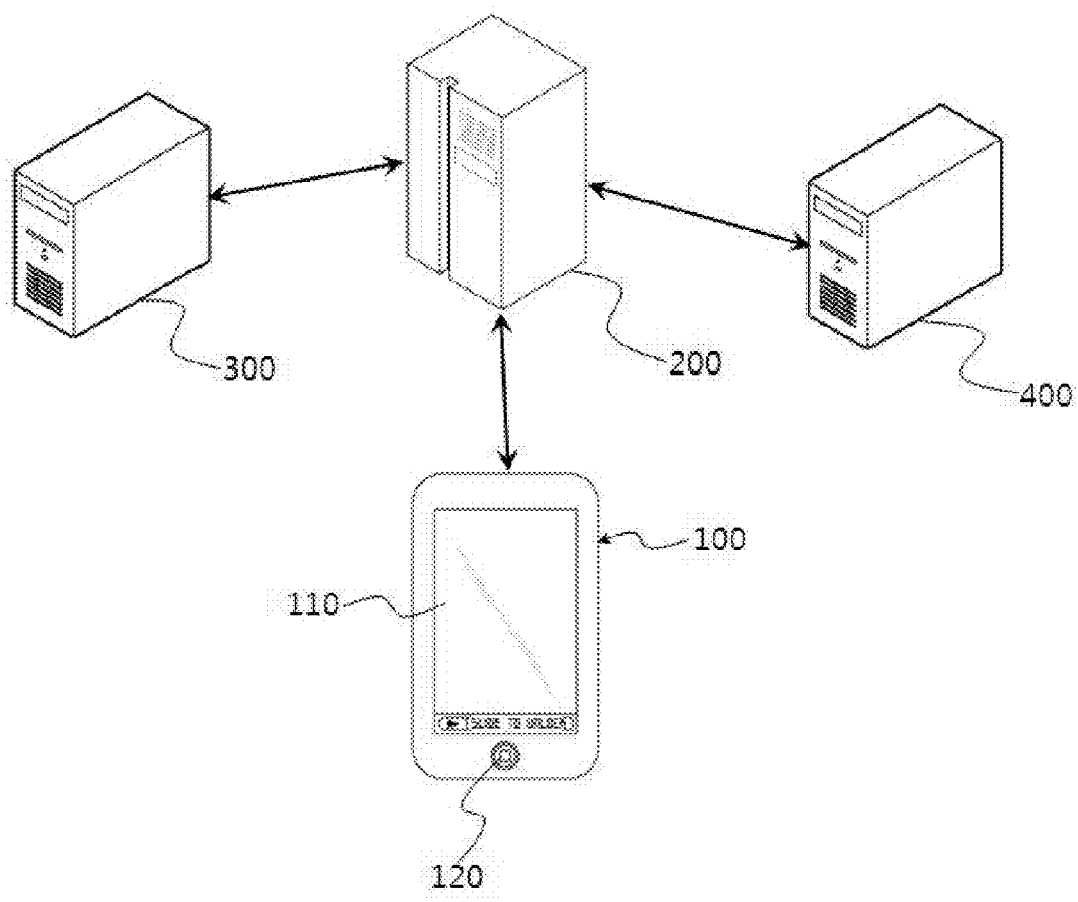
FIG. 1 schematically shows an overall constitution of a system for displaying an advertisement upon activation of a mobile communication terminal according to an exemplary embodiment of the present invention.

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness. Like reference numerals refer to the same or like functions in several aspects throughout the drawings.

Hereinafter, exemplary embodiments of the present invention will be described in detail with reference to the accompanying drawings such that those of ordinary skill in the art to which the present invention pertains can readily implement the present invention.

EXEMPLARY EMBODIMENTS OF PRESENT INVENTION

The term "mobile communication terminal" used herein denotes a digital device having wired and wireless communication functions or other functions, that is, a digital device having a memory means and a microprocessor for a computation function, such as a cellular phone, a navigator, a web pad, a personal digital assistant (PDA), a workstation and a personal computer (PC). In a part of this specification, description will be made by taking a mobile communication terminal (e.g., a cellular phone) for example, but the present invention is not limited to a mobile communication terminal.

The term "inactive state" used herein denotes a state in which a mobile communication terminal is capable of communication, but a display screen is off. Even when the display screen is off, a predetermined function (e.g., a music play function) may be carried out. Thus, the term "inactive state" used herein corresponds to a comprehensive concept of a state in which the display screen is off regardless of whether or not the mobile communication is performing a predetermined operation. However, a state in which the mobile communication terminal is completely turned off is excluded.

The term "active state" used herein denotes a state in which a display screen of a mobile communication terminal is on. A switch from the "inactive state" to the "active state" means switching from a state in which the display screen is off to a state in which the display screen is on regardless of information displayed on the display screen that is on. For example, even a case in which only a lock image is displayed may be referred to as the "active state" of the mobile communication terminal.

Constitution of Overall System

FIG. 1 schematically shows an overall constitution of a system for displaying an advertisement upon activation of a mobile communication terminal according to the present invention.

Referring to FIG. 1, an overall system according to an exemplary embodiment of the present invention may include a mobile communication terminal 100, an advertisement providing system 200, an advertiser server 300, and another service providing server 400.

According to an exemplary embodiment, the mobile communication terminal 100, the advertisement providing system 200, the advertiser server 300, and the other service providing server 400 may communicate via a communication network. The communication network may be configured for any form of communication such as wired communication and wireless communication, and implemented as a variety of communication networks such as a local area network (LAN), a metropolitan area network (MAN) and a wide area network (WAN). Preferably, the communication network according to an exemplary embodiment of the present invention is the known world wide web (WWW), or the like.

According to an exemplary embodiment, the mobile communication terminal 100 may include a display unit 110 and an activation button 120.

In an example of FIG. 1, the display unit 110 is provided in a front side of a frame constituting the mobile communication terminal 100, and the activation button 120 is provided under the display unit 110. However, the display unit 110 and the activation button 120 may be formed in a different way than as mentioned above. For example, the display unit 100 may not be formed in an overall side of the mobile communication terminal 100. In other words, the display unit 100 may be formed in at least a portion of the display unit 100, and the activation button 120 may be formed in a different portion than the display unit.

The display unit 110 displays various information on operation states of the mobile communication terminal 100, and also displays an interface for an input of a user when the mobile communication terminal 100 is driven by a touch screen. In general, when the user has not manipulated the mobile communication terminal 100 for a predetermined time, the mobile communication terminal 100 is placed in the inactive state. Manipulation by the user denotes input through the interface displayed on the display unit 110, manipulation through the button 120, manipulation through another function key (e.g., a volume key), or so on. A condition for the inactive state may be set by the user. For example, a setting menu can be accessed through the interface displayed on the display unit 110 to set the condition. By way of example, when there has been no user input for the predetermined time, the mobile communication terminal 100 may be switched to the inactive state. Meanwhile, when another button (e.g., on/off button) provided in the mobile communication terminal 100 is pressed, the mobile communication terminal 100 may be switched to the inactive state. For example, when the on/off button is pressed for a long time while the mobile communication terminal 100 is in the active state, the mobile communication terminal 100 may be turned off, but when the on/off button is pressed for a short time, the mobile communication terminal 100 may be placed in the inactive state, which is a communication-enabled state in which a phone call can be received.

The activation button 120 is a means for switching the mobile communication terminal 100 from the inactive state to the active state. In other words, when the user presses the activation button 120 while the mobile communication terminal 100 is in the inactive state, the mobile communication terminal 100 is switched to the active state. FIG. 1 shows a state in which a lock image is displayed on the display unit 110 when the activation button 120 is pressed while the mobile communication terminal 100 is in the inactive state. However, the activation button 120 may function as a means for another operation (e.g., a means for displaying a standby image while an operation state is displayed on the display unit 110, or a means for displaying a list of currently running programs).

Figure 2:
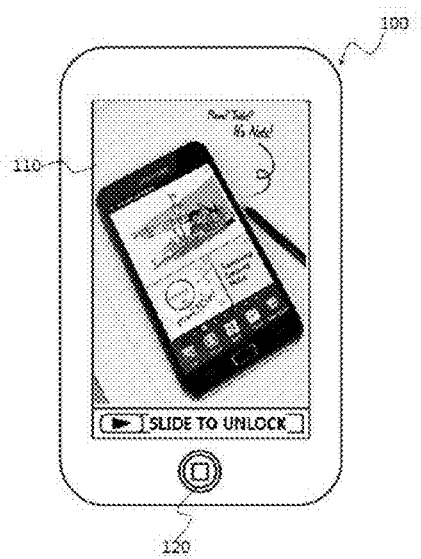
FIG. 2 shows an example in which an advertisement is displayed on a display unit according to the exemplary embodiment of the present invention when a mobile communication terminal is switched to an active state.

In an exemplary embodiment of the present invention, when the user presses the activation button 120 while the mobile communication terminal 100 is in the inactive state, the mobile communication terminal 100 is switched to the active state, and also a predetermined advertisement is displayed on the display unit 110. FIG. 2 shows an example in which an advertisement is displayed on the display unit 110 according to an exemplary embodiment of the present invention when the mobile communication terminal 100 is switched to the active state.

In an exemplary embodiment, display of an advertisement may be performed as an application previously installed in the mobile communication terminal 100 is run. In other words, upon activation of the mobile communication terminal 100 by the activation button 120, the application enabling display of an advertisement may be run, and thus the advertisement may be displayed on the display unit 110. The application may have been previously transmitted from an external system, such as the advertisement providing system 200 or the advertiser server 300, and installed.

Meanwhile, in another exemplary embodiment, when the mobile communication terminal 100 is activated, an advertisement provided by the advertisement providing system 200 may be displayed on the display unit 110. Advertising information from the advertisement providing system 200 may be received before the mobile communication terminal 100 is activated (e.g., when the mobile communication terminal 100 is deactivated, or at other times), or upon activation of the mobile communication terminal 100.

Advertisements may be randomly selected and displayed, or only advertisements selected under a predetermined condition may be displayed.

In an exemplary embodiment, on the basis of current location information on the mobile communication terminal 100, only advertisements related to the current location may be displayed. Specifically, on the basis of current location information on the mobile communication terminal 100, advertisements for companies around the location may be displayed. A location of the mobile communication terminal 100 may be detected upon activation, or constantly detected in real time.

In another exemplary embodiment, on the basis of information on the user of the mobile communication terminal 100, customized advertisements may be displayed. For example, on the basis of the gender, age, residence, job, interests, etc. of the user, advertisements for related companies may be displayed. The user information may be input and stored by the user when the user subscribes to an advertisement providing service or installs an application enabling display of advertisements. The user information may be stored in the mobile communication terminal 100, or transmitted to and stored in the advertisement providing system 200.

Meanwhile, in still another exemplary embodiment of the present invention, different advertisements may be displayed on the display unit 110 according to time. For example, advertisements for restaurants may be displayed at mealtimes, and advertisements for dramas broadcast at the corresponding time may be displayed at the drama broadcasting time.

Factors whereby the type of a displayed advertisement is determined have been described above, and at least two of these factors may be combined to determine the type of an advertisement. For example, an advertisement may be displayed in consideration of both current location information and user information. Also, advertisements may come in various forms such as brand advertisements, program advertisements, service advertisements, promotion advertisements and event advertisements, in addition to advertisements of specific products.

Meanwhile, in an exemplary embodiment of the present invention, when the user makes an additional input while an advertisement is displayed on the display unit 110, various operations may be performed. As an example, when the user clicks the displayed advertisement, access to a web page related to the advertisement, etc. may be performed. The web page may provide information on a company or product related to the advertisement, discount information, location information, and so on.

Figure 3:
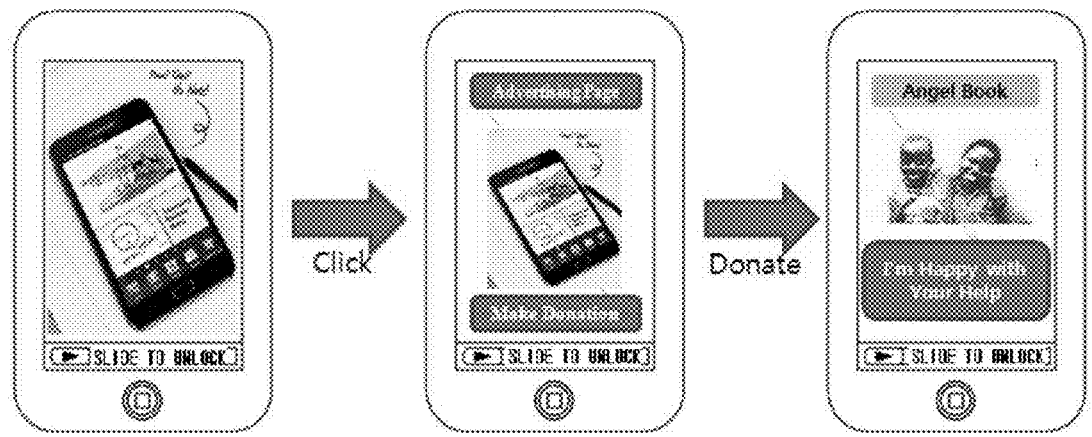
FIG. 3 illustrates a process of using a portion of advertising revenue as a donation according to an exemplary embodiment of the present invention.

As another example, when the corresponding advertisement is clicked, a predetermined portion of the advertising revenue earned by an advertising company may be used as a donation. FIG. 3 illustrates a process of making a donation by clicking an advertisement displayed on the display unit 110. Referring to FIG. 3, an interface for selecting whether or not to "Make Donation" may be provided by clicking an advertisement. When the user requests "Make Donation," a portion of the advertising revenue may be used as a donation, and the related image (e.g., a social network page such as Angel Book) may be displayed.

Meanwhile, in an exemplary embodiment of the present invention, a specific application may be run when the mobile communication terminal 100 is activated, but an advertisement may be displayed only when there is no update of information to be provided to the user by the application. For example, when the mobile communication terminal 100 is activated, a social network service provided by the other service providing server 400 may be run, and the corresponding page may be displayed on the display unit 110. At this time, an advertisement may be displayed only when there is no new content that has not been checked by the user on the page.

An overall system for displaying an advertisement upon activation of a mobile communication terminal according to an exemplary embodiment of the present invention will be described below.

Advertisement Providing System

Figure 4:
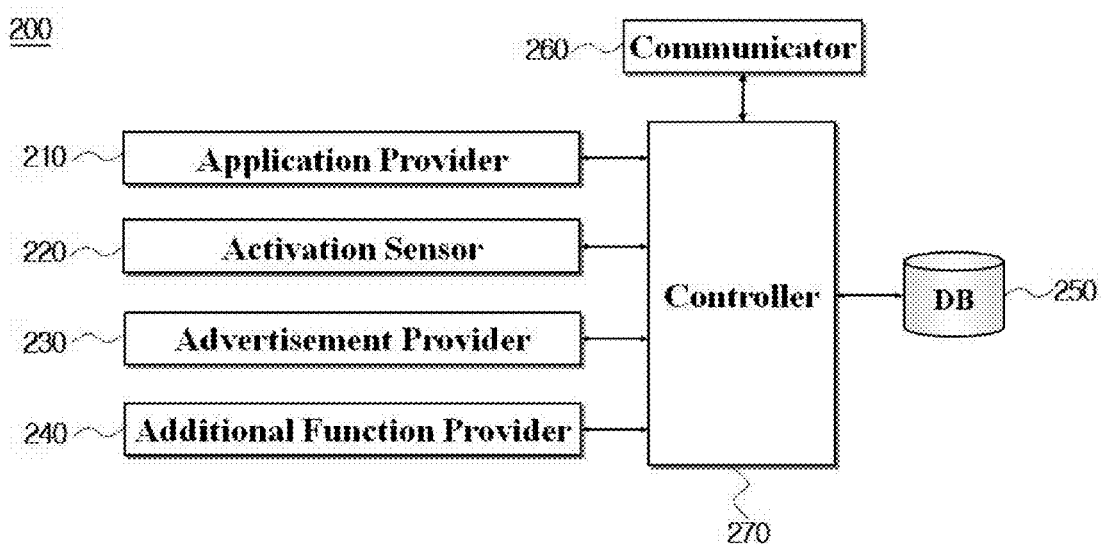
FIG. 4 is a block diagram showing a constitution of an advertisement providing system according to an exemplary embodiment of the present invention.

FIG. 4 is a block diagram showing a constitution of an advertisement providing system according to an exemplary embodiment of the present invention.

Referring to FIG. 4, an advertisement providing system 200 may include an application provider 210, an activation sensor 220, an advertisement provider 230, an additional function provider 240, a database 250, a communicator 260, and a controller 270. In an exemplary embodiment of the present invention, the application provider 210, the activation sensor 220, the advertisement provider 230, the additional function provider 240, the database 250, the communicator 260 and the controller 270 may be program modules or pieces of hardware capable of communicating with an external apparatus. These program modules or pieces of hardware may be included in the advertisement providing system 200 or another apparatus capable of communicating with the advertisement providing system 200 in the form of an operating system (OS), application program modules and other program modules, and may be physically stored in various known memories. These program modules or pieces of hardware include routines, subroutines, programs, objects, components, data structures, etc. for performing a specific task to be described later or executing a specific abstract data type, but are not limited to these.

The application provider 210 provides an application for displaying an advertisement on the display unit 110 when the mobile communication terminal 100 is switched to the active state. A user may access the advertisement providing system 200 through the mobile communication terminal 100 to receive and install the application. The application may have a function of transmitting information on the current location of the mobile communication terminal 100, user information, time information at the current location, etc. to the advertisement providing system 200. However, when a method of displaying an advertisement on the display unit 110 when the mobile communication terminal 100 is switched to the active state is used without installation of the application, the application provider 210 may be omitted.

The activation sensor 220 according to an exemplary embodiment may sense that the mobile communication terminal 100 is switched from the inactive state to the active state. When the user presses the activation button 120 of the mobile communication terminal, the mobile communication terminal 100 may transmit a signal indicating activation of the mobile communication terminal 100 to the advertisement providing system 200.

When it is sensed that the mobile communication terminal 100 is activated, the advertisement provider 230 according to an exemplary embodiment functions to display a predetermined advertisement on the display unit 110 of the mobile communication terminal 100. The advertisement may have been previously stored in the mobile communication terminal 100 or the database 250 of the advertisement providing system 200. The advertisement providing system 200 may receive advertising content from the advertiser server 300 in advance and store the advertising content in the database 250. The advertising content may be categorized and stored according to predetermined classification criteria. For example, according to locations, user characteristics and time, advertising content to be provided may be classified and stored. The advertisement provider 230 may select a piece of advertising content to be provided when the mobile communication terminal 100 is activated, with reference to the database 250, under a predetermined condition and provide the selected piece of advertising content to the mobile communication terminal 100. Meanwhile, an application provided from the other service providing server 400 may be set to run when the mobile communication terminal 100 is switched to the active state. In this case, when there is no new information to be provided with the application to the user, or to be provided to the user by the application, an advertisement may be provided.

On the other hand, in another exemplary embodiment of the present invention, pieces of advertising content, condition information on advertisements to be displayed, etc. all may be included in the application provided by the application provider 210, and the mobile communication terminal 100 may perform an advertisement display operation by itself when it is switched to the active state.

The additional function provider 240 according to an exemplary embodiment performs an additional function according to a request of the user, on the basis of an advertisement provided by the advertisement provider 230. For example, the additional function provider 240 may provide a function of displaying additional information on the advertisement in response to the user's click on the advertisement, a function of accessing the related web page, a function of providing information on the advertised product or service, a function of using a portion of the advertising revenue as a donation, and other functions.

In a modified embodiment of the present invention, the above-mentioned functions of the advertisement providing system 200 may be independently performed in the mobile communication terminal 100. In other words, in the mobile communication terminal 100, activation may be sensed, and display of an advertisement, performance of an additional function through a click of the advertisement, etc. may be achieved.

The communicator 260 according to an exemplary embodiment of the present invention enables communication between the advertisement providing system 200 and the mobile communication terminal 100, the advertiser server 300, the other service providing server 400, and so on.

In an exemplary embodiment, the controller 270 may perform a function of controlling data flow between the application provider 210, the activation sensor 220, the advertisement provider 230, the additional function provider 240, the database 250 and the communicator 260. In other words, the controller 270 according to the present invention may control the application provider 210, the activation sensor 220, the advertisement provider 230, the additional function provider 240, the database 250 and the communicator 260 to respectively perform their unique functions.

The above-described exemplary embodiments of the present invention can be implemented in the form of program commands executable by means of various computer components and recorded in a computer-readable recording medium. The computer-readable recording medium can store any or a combination of programs, commands, data files, data structures, and so on. The program commands recorded in the computer-readable recording medium may be specially designed and structured for the present invention, or program commands well-known and usable by those of ordinary skill in the art. Examples of the computer-readable recording medium include magnetic media such as a hard disk, a floppy disk and a magnetic tape, optical media such as compact disc read-only memory (CD-ROM) and digital versatile disc (DVD), magneto-optical media such as a floptical disk, and hardware devices that are specially structured to store and execute program commands such as a ROM, a random access memory (RAM) and a flash memory. The program commands include high-level language codes that can be executed by a computer using an interpreter, as well as machine language code produced by a compiler. The hardware devices can be configured to operate as one or more software modules to perform a process of the present invention and vice versa.

In exemplary embodiments of the present invention, an advertisement display function is added to an activation button that a terminal generally has, such that advertising revenue can be created from advertisement display on the terminal and efficient advertisement effects can be obtained when the activation button is habitually pressed by a user.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A mobile communication terminal, comprising:
a display unit;
a memory; and
a processor,
wherein the mobile communication terminal includes, stored in the memory and configured to be executed by the processor, instructions for:
sensing a change from an inactive state of the mobile communication terminal to an active state of the mobile communication terminal, wherein in the inactive state the display unit is turned off while the mobile communication terminal being communicable, wherein in the active state the display unit is turned on while the mobile communication terminal being communicable; and
performing a predetermined operation upon sensing the change from the inactive state to the active state, wherein the predetermined operation is display of a lock screen on the display unit,
wherein the lock screen includes an advertisement, an unlock interface and an additional input interface,
wherein the unlock interface is configured to unlock the mobile communication terminal from the lock screen, and
wherein the additional input interface is configured to display an additional information related to the advertisement.

2. The mobile communication terminal according to claim 1, the mobile communication terminal further comprising an activation button,
wherein the mobile communication terminal changes from the inactive state to the active state when the activation button is pressed.

3. The mobile communication terminal according to claim 2, wherein the predetermined operation differs according to the number of presses or a press time of the activation button.

4. The mobile communication terminal according to claim 1, wherein the display unit is touch capable of receiving user input for controlling the mobile communication terminal.

5. The mobile communication terminal according to claim 1, wherein the advertisement is randomly selected or selected under a predetermined condition.

6. The mobile communication terminal according to claim 5, wherein the predetermined condition includes current location information whereby the advertisement related to the current location is provided.

7. The mobile communication terminal according to claim 6, wherein the advertisement related to the current location is for a company around the current location.

8. The mobile communication terminal according to claim 5, wherein the predetermined condition includes user characteristic information.

9. The mobile communication terminal according to claim 5, wherein the predetermined condition includes current time.

10. The mobile communication terminal according to claim 5, wherein the predetermined condition includes a combination of at least two of current location information, user characteristic information or current time.

11. The mobile communication terminal according to claim 1, wherein the predetermined operation further provides a social network service, and
wherein the advertisement is displayed only when there is no new content that has not been checked by a user.

12. The mobile communication terminal according to claim 1, wherein the additional input interface is provided on an image of the advertisement, wherein the additional input interface is capable of receiving input through the image of the advertisement.

13. The mobile communication terminal according to claim 1, wherein the additional information provides information related to the advertisement including at least one of company information, product information, discount information, or location information.

14. A method for providing an advertisement in a lock screen of a mobile communication terminal, the method comprising:
sensing a change from an inactive state to an active state of the mobile communication terminal, wherein in the inactive state a display unit is turned off while mobile communication terminal being communicable; and
performing a predetermined operation, upon sensing the change from the inactive state to the active state, wherein the predetermined operation comprises display of the lock screen on the display unit,
wherein the lock screen includes an advertisement, an unlock interface and an additional input interface,
wherein the unlock interface is configured to unlock the mobile communication terminal from the lock screen, and
wherein the additional input interface is configured to display an additional information related to the advertisement.

15. The method according to claim 14, wherein the change from the inactive state to the active state is conducted by pressing an activation button.

16. The method according to claim 14, wherein the predetermined operation differs according to at least one of the number of presses or a press time of the activation button.

17. The method according to claim 14, wherein the advertisement is at least one of randomly selected or selected under a predetermined condition.

18. The method according to claim 17, wherein the predetermined condition includes current location information whereby the advertisement related to the current location is provided.

19. The method according to claim 18, wherein the advertisement related to the current location is for a company around the current location.

20. The method according to claim 17, wherein the predetermined condition includes user characteristic information.

21. The method according to claim 17, wherein the predetermined condition includes current time.

22. The method according to claim 17, wherein the predetermined condition includes a combination of at least two of current location information, user characteristic information or current time.

23. The method according to claim 14, wherein the application further provides a social network service, and
wherein the advertisement is displayed only when there is no new content that has not been checked by a user.

24. The method according to claim 14, wherein the additional input interface is provided on an image of the advertisement, wherein the additional input interface is capable of receiving input through the image of the advertisement.

25. The method according to claim 14, wherein the additional information provides information related to the advertisement including at least one of company information, product information, discount information, or location information.

* * * * *